United States Patent
Sayama

(10) Patent No.: US 8,094,792 B2
(45) Date of Patent: Jan. 10, 2012

(54) TRANSMISSION APPARATUS AND METHOD FOR TRANSMISSION APPARATUS TO TRANSFER RECEIVED DATA

(75) Inventor: Katsumi Sayama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1434 days.

(21) Appl. No.: 11/635,144

(22) Filed: Dec. 6, 2006

(65) Prior Publication Data

US 2007/0133765 A1    Jun. 14, 2007

(30) Foreign Application Priority Data

Dec. 14, 2005    (JP) .................................. 2005-359793

(51) Int. Cl.
*H04M 11/00*    (2006.01)
(52) U.S. Cl. .............. 379/100.01; 379/88.13; 379/93.01; 379/142.07; 358/1.1; 358/405; 358/411
(58) Field of Classification Search .............. 379/88.13, 379/93.01, 100.01, 142.07
See application file for complete search history.

(56) References Cited

U.S. PATENT DOCUMENTS

2006/0262343 A1 * 11/2006 Kikuchi et al. .............. 358/1.15

FOREIGN PATENT DOCUMENTS

| JP | 2-200058 | 8/1990 |
|---|---|---|
| JP | 04-165743 | * 6/1992 |
| JP | 4-290061 | 10/1992 |
| JP | 2000-115434 | 4/2000 |
| JP | 2005-159593 | 6/2005 |
| JP | 2005-217879 | 8/2005 |

OTHER PUBLICATIONS

Apr. 13, 2010 Japanese search report in connection with counterpart Japanese patent application No. 2005-359793.

* cited by examiner

*Primary Examiner* — Curtis Kuntz
*Assistant Examiner* — Yosef K Laekemariam
(74) *Attorney, Agent, or Firm* — Cooper & Dunham LLP

(57) ABSTRACT

A facsimile apparatus is disclosed that includes a register unit that registers transmission destination information in an internal address book. The register unit receives a number input at least a first time and a second time, and upon determining that a number input the first time and a number input the second time correspond to a same input number, registers the same input number as a valid facsimile number.

13 Claims, 5 Drawing Sheets

(ADDRESS BOOK INFORMATION)

(ADDRESS INFORMATION)

(INPUT NUMBER
CONFIRMATION INFORMATION)

TRANSMISSION APPARATUS AND METHOD FOR TRANSMISSION APPARATUS TO TRANSFER RECEIVED DATA

BACKGROUND

1. Technical Field

This disclosure relates to a facsimile apparatus that has a register unit for registering a transmission destination in an internal address book.

2. Description of the Related Art

There are cases in which a user designates a wrong destination upon sending a document via facsimile transmission.

When the receiving side is a facsimile apparatus, the document is transmitted even when the designated destination is wrong.

Under such circumstances, irreparable damage and harm may be caused when a confidential document or a document containing personal information is mistakenly transmitted to a wrong destination, for example.

In order to prevent such an inconvenience, for example, Japanese Laid-Open Patent Publication No. 2005-217879 discloses an apparatus that implements a mode of not performing transmission operations when a fax number that is not registered in its address book is input as the facsimile transmission destination.

However, even in such an apparatus, a document can still be sent to a wrong destination if the registered information in the address book is erroneous.

BRIEF SUMMARY

According to an aspect of this disclosure, a facsimile apparatus is provided that promotes accurate designation of a transmission destination.

According to another aspect, a facsimile apparatus is provided that includes:

a register unit that registers transmission destination information in an internal address book;

wherein the register unit receives a number input at least a first time and a second time, and upon determining that a number input the first time and a number input the second time correspond to a same input number, registers the same input number as a valid facsimile number.

In a preferred embodiment, the aforementioned facsimile apparatus further includes:

a transmission unit that receives a destination number input at least a first time and a second time, and upon determining that a destination number input the first time and a destination number input the second time correspond to a same input destination number, performs call operations using the same input destination number as a valid destination facsimile number.

In another preferred embodiment, the aforementioned facsimile apparatus further includes:

a display unit that displays a number match indication screen indicating that the number input the first time and the number input the second time correspond to the same input number.

In another preferred embodiment, the number match indication screen indicates the same input number.

In another preferred embodiment, the number match indication screen includes a selection element for selecting whether to validate the same input number, the result of selecting the selection element being used to determine whether the same input number is to be accepted as the valid facsimile number.

In another preferred embodiment, the aforementioned facsimile apparatus further includes:

a display unit that displays a warning screen indicating that the number input the first time and the number input the second time do not correspond to the same input number.

DESCRIPTION OF THE PREFERRED EMBODIMENTS

In the following, preferred embodiments of the present invention are described with reference to the accompanying drawings.

Figure 1:
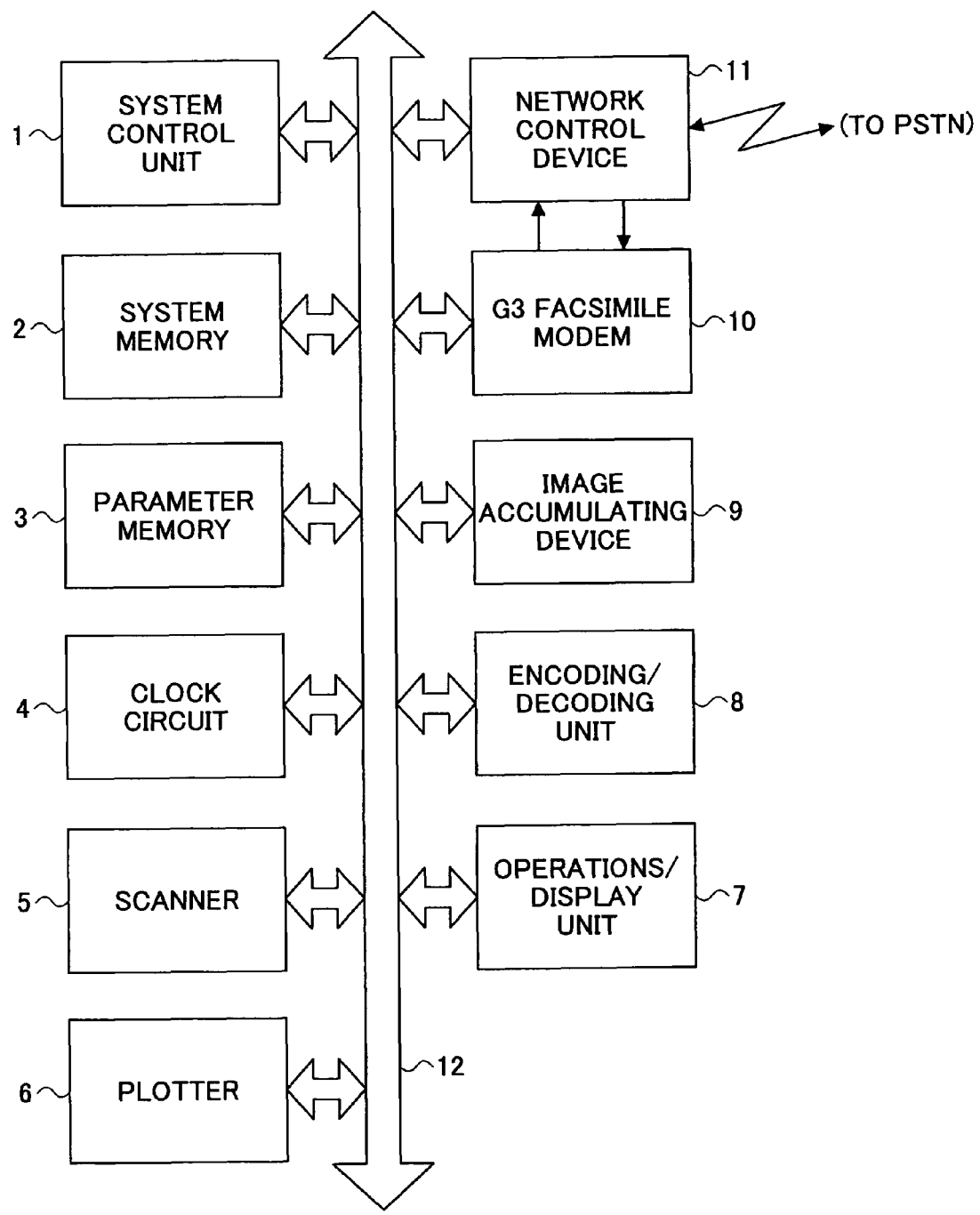
FIG. 1 is a block diagram showing a configuration of a group 3 facsimile apparatus according to an embodiment of the present invention.

FIG. 1 is a diagram showing a group 3 facsimile apparatus according to an embodiment of the present invention.

In the illustrated group 3 facsimile apparatus, a system control unit 1 performs processes for controlling the components of the present apparatus and predetermined group 3 facsimile transmission control processes, a system memory 2, which is used as a working area by the system control unit 1, stores control process programs to be executed by the system control unit 1 and data used to execute process programs, a parameter memory 3 stores information unique to the present apparatus, and a clock circuit 4 outputs current time information.

Also, a scanner 5 reads a document image at a predetermined resolution, a plotter 6 records/outputs an image at a predetermined resolution, and an operations/display unit 7 includes operation keys and a display, for example, for operating the present apparatus.

Further, an encoding/decoding unit 8 performs compression on an image signal and performs decompression on compressed image information, and an image accumulating device 9 stores plural sets of compressed image information.

A group 3 facsimile modem 10 implements group 3 facsimile modem functions including a low-speed modem function (e.g., V. 21 modem) for enabling exchange of transmission procedure signals and a high-speed modem function (e.g., V. 17 modem, V. 34 modem, V. 29 modem, V. 27 ter modem) for primarily enabling exchange of image information.

A network control device 11 connects the present group 3 facsimile apparatus to an analog public communications network PSTN and has an automatic call transmitting/receiving function.

The system control unit 1, the system memory 2, the parameter memory 3, the clock circuit 4, the scanner 5, the plotter 6, the operations/display unit 7, the encoding/decoding unit 8, the image accumulation device 9, the group 3 facsimile modem 10, and the network control device 11 are interconnected by an internal bus 12, and data exchanges between these elements are primarily performed via this internal bus 12.

It is noted that data may be directly exchanged between the network control device 11 and the group 3 facsimile modem 10.

Figure 2A:
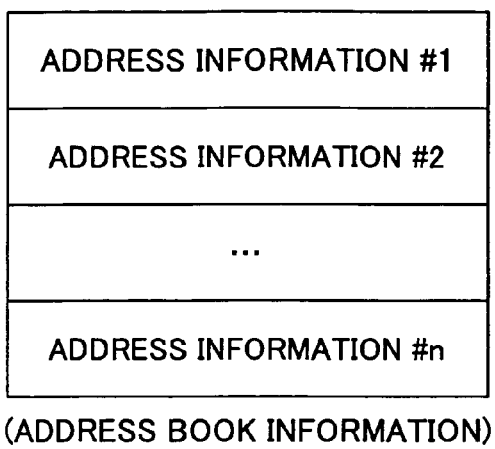
FIGS. 2A-2C are diagrams illustrating examples of address book information, address information, and input number confirmation information.
Figure 2B:
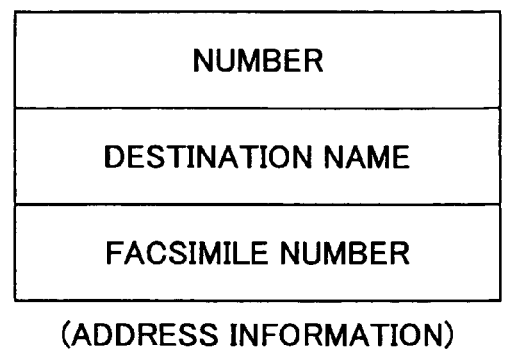

In one embodiment, the group 3 facsimile apparatus may include address book information as is illustrated in FIG. 2A. The address book information may register address information including information items shown in FIG. 2B such as a number for identifying the registered address information, a destination name, and a facsimile number.

In one embodiment, input number confirmation operations may be performed when registering address information or inputting a transmission destination through operation of the operations/display unit 7. Specifically, a user may be prompted to input a number two times so that the number input the first time and the number input the second time may be compared, and the input number may be validated only when the first input number and the second input number are determined to match, for example.

Figure 2C:
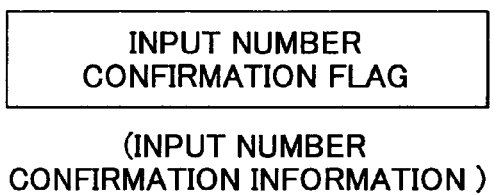

In a further embodiment, a determination may be made as to whether the input number confirmation operations are to be performed by referring to the value of an input number confirmation flag registered in input number confirmation information as is illustrated in FIG. 2C. The value of the registered input number confirmation flag may be changed by the user via the operations/display unit 7, for example.

Figure 3:
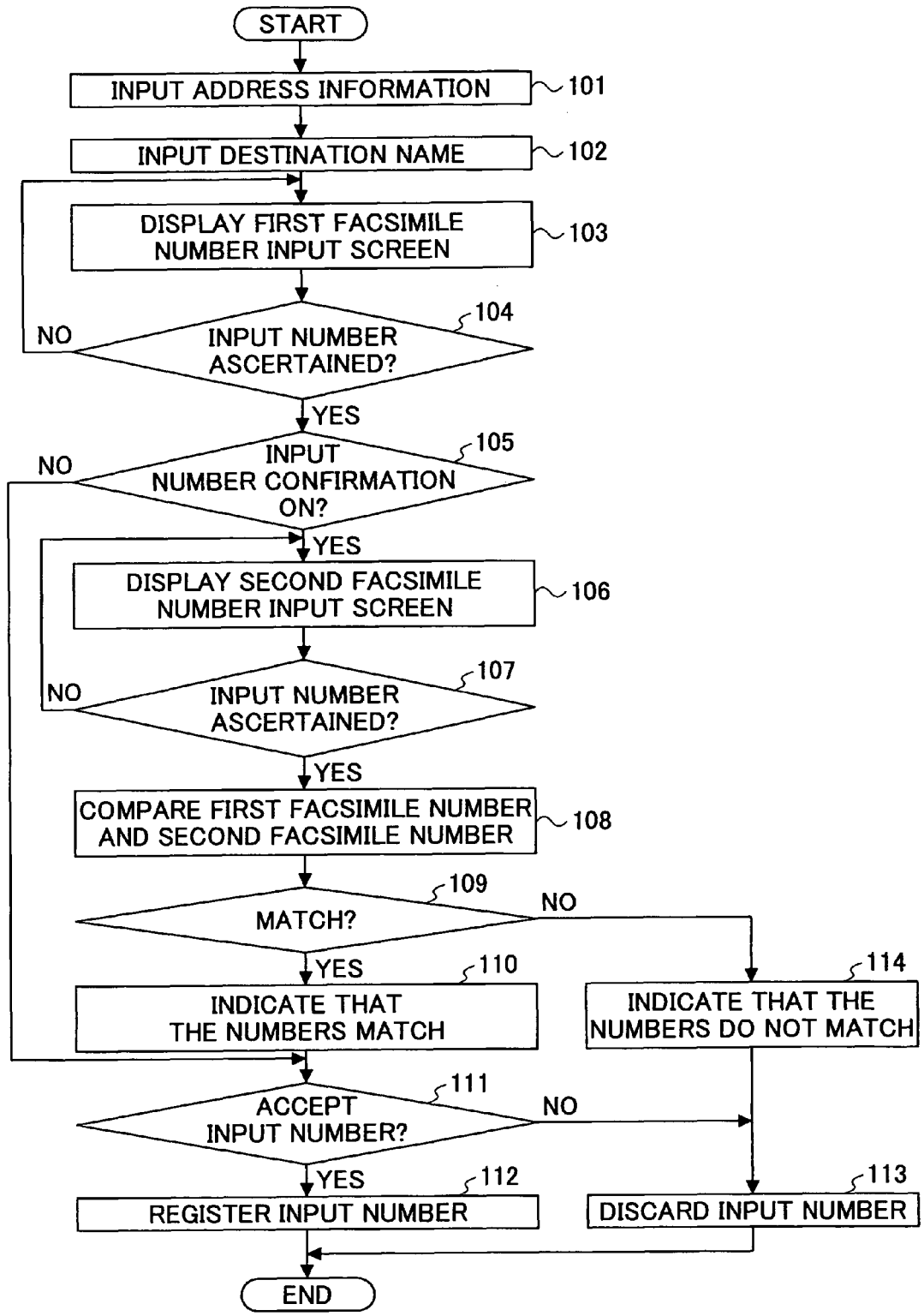
FIG. 3 is a flowchart illustrating an exemplary process of registering address information in address book information.

FIG. 3 is a flowchart illustrating an exemplary process for registering address information in the address book information. It is noted that input operations in this process may be performed through operation of the operations/display unit 7 by a user, for example. Also, relevant information may be displayed to the user via the operations/display unit 7, for example.

According to the illustrated process, when a user selects address information input operations (step 101), the user is prompted to input a destination name (step 102). Then, a first facsimile number input screen is displayed, and the user is prompted to input a facsimile number and wait for the input number to be ascertained (loop formed by step 103 and negative determination NO in step 104). When the first input of the facsimile number is ascertained so that a positive determination (YES) is made in step 104, a determination is made as to whether the input number confirmation flag value of the input number confirmation information is ON (step 105). When a positive determination (YES) is made in step 105, a second facsimile number input screen is displayed to prompt the user to input the facsimile number for a second time and wait for the input to be ascertained (loop formed by step 106 and negative determination NO in step 107).

When the second input of the facsimile number is ascertained so that a positive determination (YES) is made in step 107, the facsimile number input the first time and the facsimile number input the second time are compared (step 108), and a determination is made as to whether the two input facsimile numbers match (step 109).

Figure 4A:
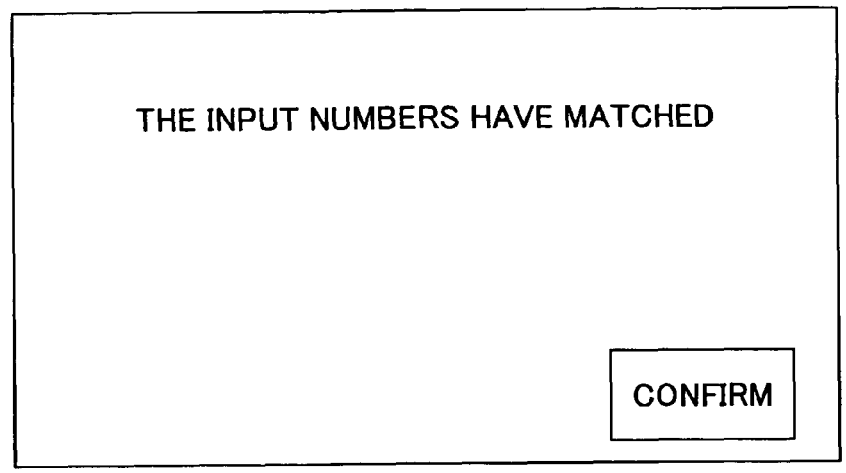
FIGS. 4A-4C are diagrams illustrating examples of display screens.
Figure 4B:
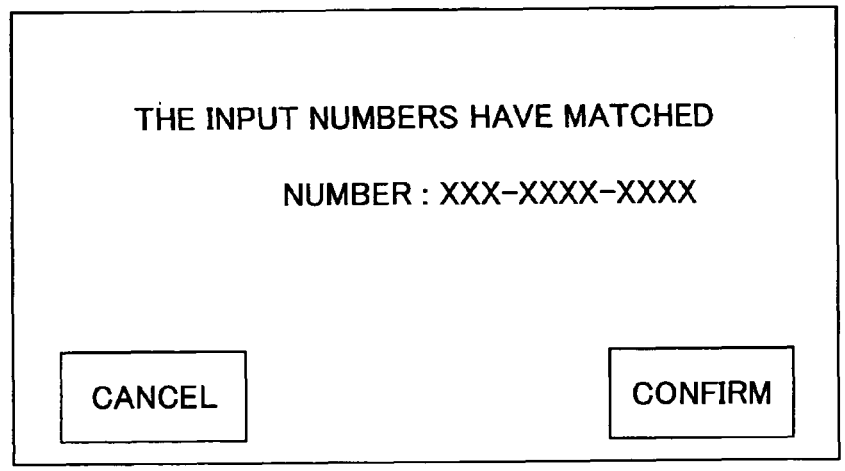

When the two input facsimile numbers match so that a positive determination (YES) is made in step 109, for example, a number match indication screen as is shown in FIG. 4A indicating that the two inputs match or a number match indication screen as is shown in FIG. 4B indicating that the two inputs match and the input number itself may be displayed (step 110).

Then, a determination is made as to whether designation operations (e.g., operation of the 'CONFIRM' button of the number match indication screen of FIG. 4B) have been performed for indicating acceptance of the facsimile number input by the user as a valid number (step 111). If a positive determination (YES) is made in step 111, the input number is registered as a facsimile number of a new set of address information (step 112) and the process is ended.

If a negative determination (NO) is made in step 111, the input number is discarded (step 113), and registration operations are not performed.

Figure 4C:
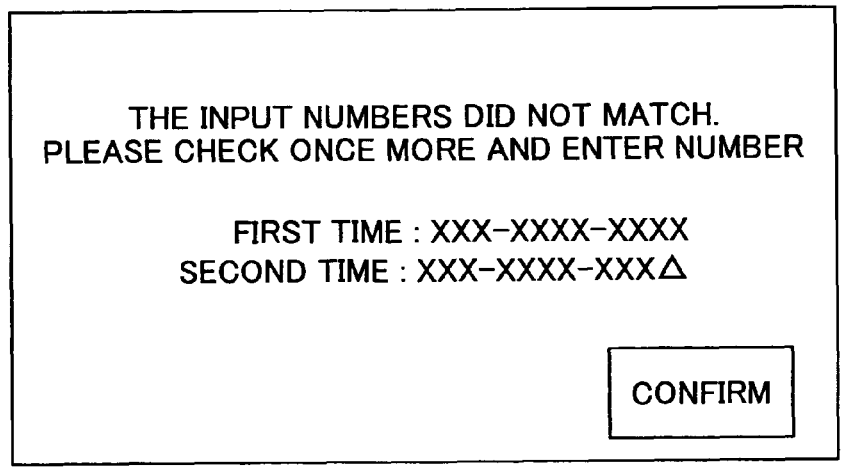

It is noted that when the facsimile number input the first time and the facsimile number input the second time do not match so that a negative determination (NO) is made in step 109, a warning screen as is shown in FIG. 4C indicating that the input numbers do not match may be displayed (step 114) after which the process moves on to step 113 where the input numbers are discarded and the process is ended.

Also, it is noted that when the value of the input number confirmation flag of the input number confirmation information is OFF so that a negative determination (NO) is made in step 105, the process moves on to step 111.

Figure 5:
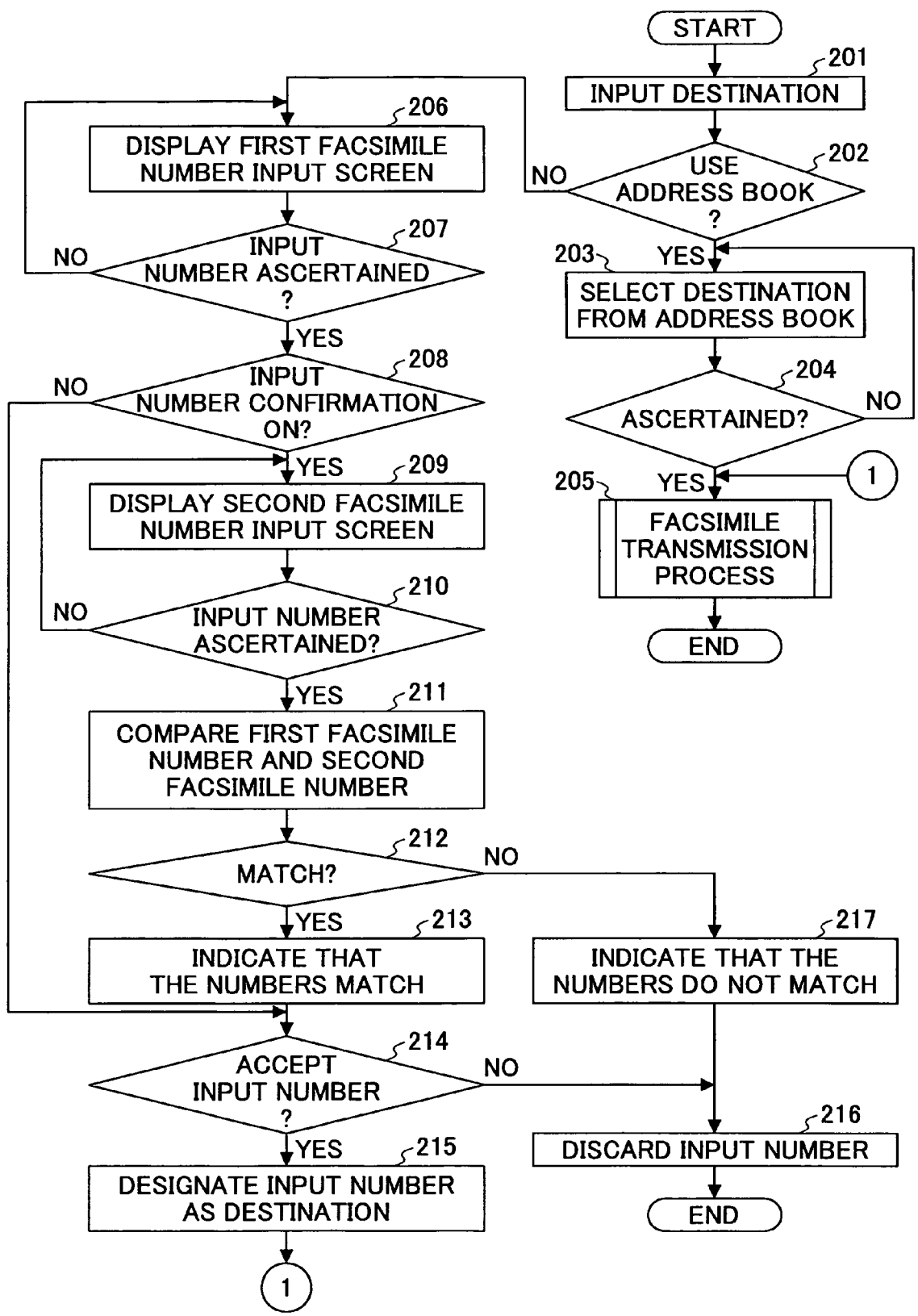
FIG. 5 is a flowchart illustrating an exemplary process to be executed when a facsimile transmission command is issued.

FIG. 5 is a flowchart illustrating an exemplary process that is preformed in response to the issuance of a facsimile transmission command. It is noted that input operations in this process may be performed through operation of the operations/display unit 7 by a user, for example. Also, information may be displayed to the user via the operations/display unit 7, for example.

According to the illustrated process, when operations for inputting a transmission destination are performed by a user (step 201), a determination is made as to whether use of the address book is selected for inputting the transmission destination (step 202). When the user selects to use the address book so that a positive determination (YES) is made in step 202, operations are performed for enabling selection (input) of a transmission destination from the address book and waiting for the input to be ascertained (loop formed by step 203 and negative determination NO of step 204).

When the input transmission address is ascertained so that a positive determination (YES) is made in step 204, predetermined facsimile transmission operations may be performed using the input transmission destination (step 205).

On the other hand, when the user inputs a transmission destination directly through operation of the operations/display unit 7 without using the address book so that a negative determination (NO) is made in step 202, a first facsimile number input screen is displayed, and the user is prompted to input a facsimile number and wait for the input operations to be ascertained (loop formed by step 206 and negative determination NO in step 207).

When the facsimile number input the first time is ascertained so that a positive determination (YES) is made in step 207, a determination is made as to whether the value of the input number confirmation flag of the input number confirmation information is ON (step 208). If a positive determination (YES) is made in step 208, a second facsimile number input screen is displayed, and the user is prompted to input the facsimile number for a second time and wait for the input operations to be ascertained (loop formed by step 209 and negative determination NO of step 210).

When the facsimile number input the second time is ascertained so that a positive determination (YES) is made in step 210, the facsimile number input the first time and the facsimile number input the second time are compared (step 211), and a determination is made as to whether the two input facsimile numbers match (step 212).

When the two input facsimile numbers match so that a positive determination (YES) is made in step 212, the number match indication screen as is shown in FIG. 4A or FIG. 4B may be displayed (step 213).

Then, a determination is made as to whether designation operations (e.g., operation of the 'CONFIRM' button of the number match indication screen of FIG. 4B) have been performed for indicating acceptance of the facsimile number input by the user as a valid number (step 214). When a positive determination (YES) is made in step 214, the input number may be set as the destination facsimile number (step 215), and the process may move on to step 205 where facsimile transmission is performed according to the input destination.

When a negative determination (NO) is made in step 214, the input number is discarded (step 216) and facsimile transmission is not performed.

When the facsimile number input the first time and the facsimile number input the second time do not match so that a negative determination (NO) is made in step 212, for example, the warning screen as is shown in FIG. 4C indicating that the input numbers do not match may be displayed (step 217), and the process may move on to step 216 where the input numbers are discarded and the process is ended.

Also, when the input number confirmation flag value is off so that a negative determination (NO) is made in step 208, the process moves on to step 214.

As can be appreciated, according to an embodiment of the present invention, when registering a facsimile number in address book information or directly inputting a facsimile transmission destination number, a user is prompted to input the number to be registered or the destination number twice, and the registration operations or transmission operations may be enabled only when it is determined that the first and second input numbers match. In this way, registration of wrong address information or transmission to a wrong destination may be prevented.

In a preferred embodiment, when the number input the first time and the number input the second time match, a number match indication screen indicating that the input numbers match may be displayed to provide assistance to the user in input operations by informing the user that the input number is probably an accurate number.

In a further embodiment, the input number itself may be displayed on the number match indication screen so that the user may confirm whether the input number is accurate. In this way, registration of wrong address information or transmission to a wrong destination may be prevented.

In a further embodiment, a selection element for selecting to cancel or validate a designated number may be provided on the number match indication screen so that the user may select whether to use the input number.

In another embodiment, when the number input the first time and the number input the second time do not match, a warning screen may be displayed indicating that the input numbers do not match in order to inform the user that at least one of the input numbers is inaccurate to thereby prevent transmission to a wrong destination, for example.

In a further embodiment, the number input the first time and the number input the second time may be displayed on the warning screen being displayed when the input numbers do not match, so that the user may acknowledge his/her input operations error.

In another preferred embodiment, a selection element is provided for enabling a user to select whether to require a facsimile number to be input two times or only one time so that an environment conforming to the preferences of the user may be established.

It is noted that in the above-described embodiments of the present invention, applications of the group 3 facsimile apparatus are illustrated. However, the present invention is not limited to such applications and may equally be applied to other types of transmission apparatuses having facsimile communication functions.

Although the present invention is shown and described with respect to certain preferred embodiments, it is obvious that equivalents and modifications may occur to others skilled in the art upon reading and understanding the specification. The present invention includes all such equivalents and modifications, and is limited only by the scope of the claims.

The present application is based on and claims the benefit of the earlier filing date of Japanese Patent Application No. 2005-359793 filed on Dec. 14, 2005, the entire contents of which are hereby incorporated by reference.

What is claimed is:

1. A transmission apparatus, comprising:
an image data input unit that receives input of image data;
an image data transmission unit that transfers the image data;
a register unit that registers at least one destination for transferring the image data;
an instruction receiving unit that receives an instruction to use the registered destination;
a first destination input unit that receives first input of a first destination in a case where the registered destination is not used;
a second destination input unit that receives second input of a second destination after receiving the first input of the first destination;
a first determining unit that determines whether the first destination and the second destination are the same; and
a control unit that controls the image data transmission unit so as to transfer the image data to the registered destination in a case where the registered destination is used, and controls the image data transmission unit, in a case where the registered destination is not used and the first determining unit determines that the first destination and the second destination are the same, so as to transfer the image data to one of the first and second destinations that have been determined by the first determining unit to be the same.

2. The transmission apparatus as claimed in claim 1, further comprising:
a first selection unit that receives, in a case that the first determining unit determines that the first destination and the second destination are the same, a selection to use or not the one of the first and second destinations that have been determined by the first determining unit to be the same; and
a first discarding unit that discards the first destination and the second destination in a case that the first selection unit receives the selection not to use the one of the first and second destinations that have been determined by the first determining unit to be the same.

3. The transmission apparatus as claimed in claim 1, further comprising:
a display unit that displays a screen indicating that the first destination and the second destination are the same.

4. The transmission apparatus as claimed in claim 3, wherein the display unit displays the one of the first and second destinations that have been determined by the first determining unit to be the same.

5. The transmission apparatus as claimed in claim 1, further comprising:
a display unit that displays a warning screen indicating that the first destination and the second destination are not the same in a case where the first determining unit does not determine that the first destination and the second destination are the same.

6. The transmission apparatus as claimed in claim 5, wherein the display unit displays the first destination and the second destination.

7. The transmission apparatus as claimed in claim 1, further comprising:
- a third destination input unit that receives third input of a third destination, for registration by the register unit;
- a fourth destination input unit that receives fourth input of a fourth destination after receiving the third input of the third destination;
- a second determining unit that determines that the third destination and the fourth destination are the same;
- wherein the register unit registers one of the third and fourth destinations that have been determined by the second determining unit to be the same.

8. The transmission apparatus as claimed in claim 7, further comprising:
- a second selection unit that receives a selection to register or not the one of the third and fourth destinations that have been determined by the second determining unit to be the same;
- a second discarding unit that discards the third and fourth destinations that have been determined by the second determining unit to be the same, in a case that the one of the third and fourth destinations that have been determined by the second determining unit to be the same is not registered.

9. The transmission apparatus as claimed in claim 7, further comprising:
- a display unit that displays a screen indicating that the third destination and the fourth destination are the same.

10. The transmission apparatus as claimed in claim 9, wherein the display unit displays the one of the third and fourth destinations that have been determined by the second determining unit to be the same.

11. The transmission apparatus as claimed in claim 7, further comprising:
- a display unit displays a warning screen indicating that the third destination and the fourth destination are not the same in a case where the second determining unit does not determine that the third destination and the fourth destination are the same.

12. The transmission apparatus as claimed in claim 11, wherein the display unit displays the third destination and the fourth destination.

13. A method for a transmission apparatus to transfer received data, said method comprising:
- (a) receiving input of image data;
- (b) registering, by the transmission apparatus, at least one destination for transferring the image data;
- (c) receiving, by the transmission apparatus, an instruction to use the registered destination;
- (d) receiving first input of a first destination in a case where the registered destination is not used;
- (e) receiving second input of a second destination after receiving the first input of the first destination;
- (f) determining, by the transmission apparatus, whether the first destination and the second destination are the same; and
- (g) controlling an image data transmission unit of the transmission apparatus so as to transfer the image data to the registered destination in a case where the registered destination is used, and controlling the image data transmission unit, in a case that the registered destination is not used and it is determined in (f) that the first destination and the second destination are the same, so as to transfer the image data to one of the first and second destinations that have been determined in (f) to be the same.

* * * * *